United States Patent [19]

Fennel

[11] Patent Number: 5,060,159
[45] Date of Patent: Oct. 22, 1991

[54] METHOD AND CIRCUIT CONFIGURATION FOR CONTROLLING A TWO-CHANNEL ANTI-LOCK SYSTEM

[75] Inventor: Helmut Fennel, Bad Soden, Fed. Rep. of Germany

[73] Assignee: Alfred Teves GmbH, Frankfurt am Main, Fed. Rep. of Germany

[21] Appl. No.: 528,015

[22] Filed: May 23, 1990

[30] Foreign Application Priority Data

May 23, 1989 [DE] Fed. Rep. of Germany ....... 3916672

[51] Int. Cl.$^5$ .............................................. B60T 8/32
[52] U.S. Cl. .......................... 364/426.02; 364/426.01; 303/104
[58] Field of Search .................... 364/426.01, 426.02, 364/426.03; 303/103, 104

[56] References Cited

U.S. PATENT DOCUMENTS 4,718,736 1/1988 Fennel et al. ................. 364/426.02
4,729,608 3/1988 Fennel et al. ................. 364/426.02
4,930,845 6/1990 Bleckman et al. .................. 303/104
4,933,854 6/1990 Miyake ........................... 364/426.02

Primary Examiner—Salvatore Cangialosi
Attorney, Agent, or Firm—Robert P. Seitter; J. Gordon Lewis

[57] ABSTRACT

To control the brake system of a two-channel anti-lock system, solely the rotational behavior of the front wheels (VR, VL) is measured and analyzed for generating a vehicle reference speed ($V_{REF}$) and braking-pressure control signals. The quantities determining the braking pressure in the wheel brakes and/or in the brake circuits (I, II) are measured, and a wheel pressure pattern (RDM) is formed from these which, by approximation, represents the pressure variation in the wheel brakes. The wheel-pressure-pattern signals are utilized for dimensioning the valve control signals and for determining the variation of the vehicle reference speed ($V_{REF}$).

2 Claims, 1 Drawing Sheet

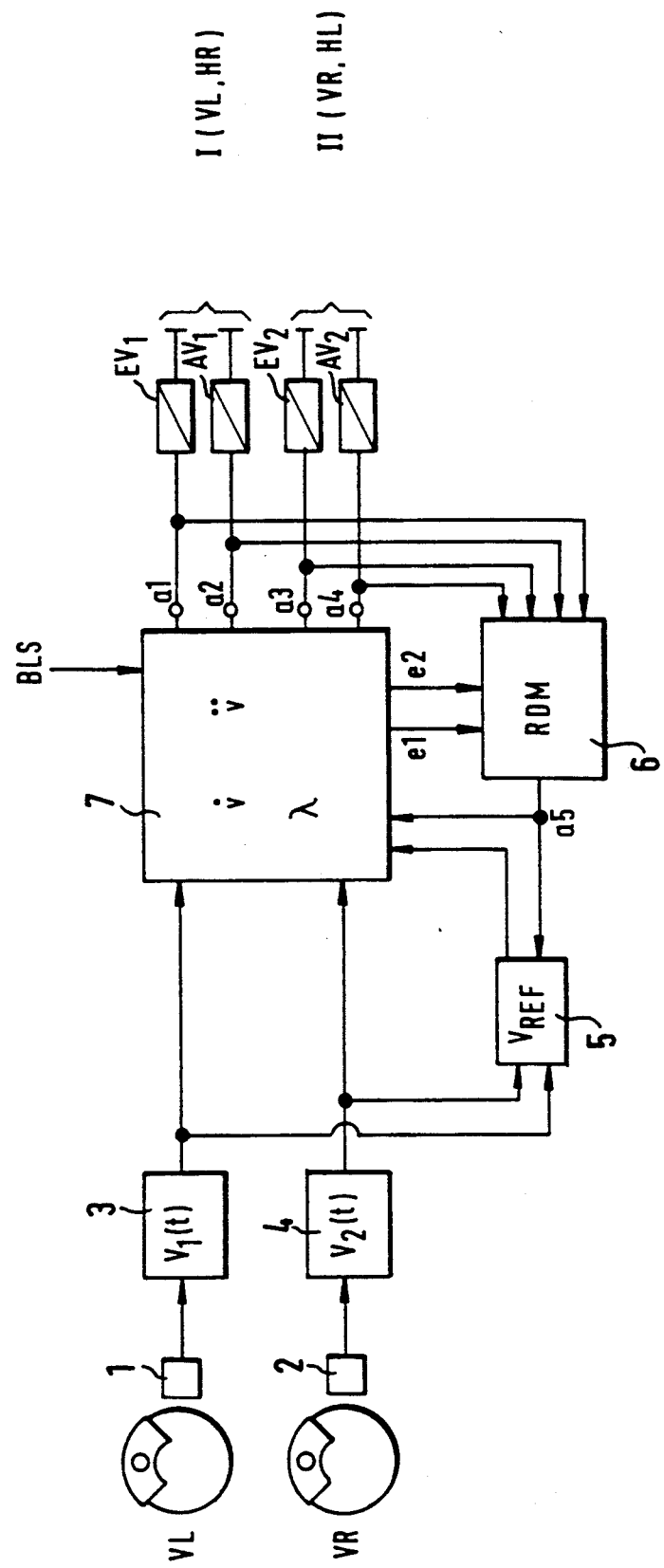

METHOD AND CIRCUIT CONFIGURATION FOR CONTROLLING A TWO-CHANNEL ANTI-LOCK SYSTEM

BACKGROUND OF THE INVENTION

The present invention relates to a method for controlling the brake system of a two-channel anti-lock system (two-channel ABS), wherein the wheel rotational behavior is measured and analyzed for generating a vehicle reference speed and braking-pressure control signals. Quantities determining the braking pressure in the wheel brakes are measured and from which measured quantities a wheel pressure pattern is derived that is by approximation representative of the pressure variation in the wheel brakes and, in conjunction with the wheel rotational behavior, is taken into account for the purpose of wheel slip control and/or for determining the braking-pressure control signals. A circuit configuration for implementing this method is provided.

In known electronic anti-lock systems, the information required for regulating the braking pressure is obtained by virtue of wheel sensors which generate for each monitored wheel an electric signal indicative of the wheel rotational behavior. As is conventional, the vehicle speed is defined by approximation by logically combining the wheel speed signals. In some braking situations or under specific conditions, for example, in the even of all-wheel drive, it is however difficult if not impossible to derive the vehicle speed sufficiently exactly from the wheel rotational behavior. For this reason, vehicle sensors measuring the translational speed, the translational acceleration or deceleration, braking pressure sensors or the like additionally have been mounted on vehicles.

However, for cost reasons, attempts are being made to utilize wheel sensors alone, and preferably only a small number of such sensors. Thus far, four wheel sensors, and under certain circumstances only three, have been considered to be necessary for a satisfactory control even in an anti-lock system with merely two control channels and, preferably, the pressure is regulated separately in each diagonal.

In principle, a control operation could be improved if the actual braking pressure that is prevailing when the control commences and/or when a wheel becomes unstable were known For this purpose, anti-lock systems are known which are additionally equipped with braking pressure sensors.

German patent application P38 09 100.3 suggests forming a wheel pressure pattern instead of measuring the actual braking pressure. Information on the pressure variation is approximately received by measuring, counting and integrating the pulses which serve to open and/or close the inlet valves and outlets valves, while additional consideration of the characteristic curves of braking-pressure increase and decrease of the wheel brakes is possible. The data relating to the instantaneous pressure obtained in this matter are taken into consideration when dimensioning the valve control pulses.

It is a general object of the present invention to more effectively analyze the information received by wheel sensors for the purpose of improving the control and/or reducing the expenditure of the sensors. It is a further object to devise a state-of-the-art two-channel anti-lock control while a minimum expenditure in the sensors.

SUMMARY OF THE INVENTION

It has been found that this object is achieved by a method, the special characteristics of which are that the vehicle reference speed preferably is determined merely by the rotational behavior of the front wheels and the wheel pressure pattern. Since the vehicle deceleration is combined with the braking pressure, as is generally known, the vehicle reference speed can be computed by means of the wheel pressure pattern. In a circuit configuration for implementing the method in accordance with the present invention, the front wheels each are equipped with one rotational speed sensor, the output signals of which are logically combinable with the wheel-pressure-pattern signals for forming the vehicle reference speed.

Taking into account the wheel pressure pattern when forming the vehicle reference speed permits realization of a two-channel ABS with only two wheel sensors mounted on the front wheels. In spite of the use of but two sensors, a sufficiently exact two-channel control operation can be ensured because of the consideration of the indirectly ascertained wheel pressure. It is assumed that each channel connects to one front wheel and one rear wheel, preferably in diagonal allotment, and that the brake force distribution onto the front axle and the rear axle is improved in a known fashion by way of a load-responsive regulator.

The reference speed is variably extrapolated during a controlled braking action on the basis of the sensor signals and the approximation information about the wheel pressure. Since all information for the control can be obtained by virtue of the front-wheel sensors, and the memorized pressure pattern, and since it is of no importance therefor whether the front wheels are driven or not, the present invention also is applicable to vehicles with all-wheel drive. This is a advantage. When forming the wheel pressure pattern, the output signal of a pedal travel sensor can be additionally utilized.

BRIEF DESCRIPTION OF THE DRAWING

Further features, advantages and and applications of this invention can be taken from the following detailed description of an embodiment taken in conjunction with the accompanying drawing in which the single view illustrates a diagramatic view of a circuit configuration for implementing the method in accordance with the present invention.

DETAILED DESCRIPTION

In the illustrated embodiment, the rotational behavior of the two front wheels VL, VR is measured by means of wheel sensors 1, 2. The output signal of these sensors is then processed in circuits 3, 4 in order to make available an analyzable signal $v_1(t)$, $v_2(t)$ indicative of the rotational behavior of the wheels. A vehicle reference speed is derived in a known manner from these wheel speed signals $v_1(t)$, $v_2(t)$. According to the present invention, the output signals of a stage 6 are additionally considered, which stage represents the wheel pressure pattern RDM and/or by approximation the pressure variation in the individual wheel brakes or in the two brake circuits.

The speed signals $v_1(t)$, $v_2(t)$, together with the reference speed $v_{REF}$ are supplied to a control logic 7 in which the first and the second time derivative known in the art as "jerk" of the speed signals $v_1'(t)$, $v_2'(t)$ and, respectively $v_1''(t)$, $v_2''(t)$ as well as the wheel slip $\lambda$ are formed in a known manner. Additionally, the output signal of a brake light switch BLS is introduced into the control logic. The signal of this brake light switch BLS advantageously is analyzed for specific so-termed "start" conditions of the formation of the wheel pressure pattern.

At the outputs a1 to a4 of the control logic 7, the braking-pressure control signals are directly available which are delivered to the inlet valves $EV_1$, $EV_2$ and to the outlet valves $AV_1$, $AV_2$ of the two diagonals I and II. The braking pressure is modulated by means of these inlet valves $EV_{1,2}$ and the outlet valves $AV_{1,2}$. It is conventional practice to connect the respectively associated front wheel to this brake circuit I or II directly, while connecting the corresponding (diagonal) rear wheel by way of a brake force distributor, for instance a so-called load-responsive regulator.

The valve timing at the outputs a1 to a4 of the control logic 7 is moreover supplied to the stage 6 for the formation of the wheel pressure pattern and, respectively, of signals approximately representative of the pressure variation in the diagonals I, II. By way of an output a5 of the stage 6, the wheel-pressure-pattern signals are delivered to the control logic 7, on the one hand, and to the circuit 5 forming the vehicle reference speed $v_{REF}$. The wheel-pressure-pattern signals are included both when dimensioning the valve timing and when calculating and extrapolating the vehicle reference speed $v_{REF}$.

Finally, the drawing further illustrates the two lines e1 and e2 through which so-called start conditions are supplied to the stage 6. For instance, the line e1 delivers a signal when a normal braking operation without slip control takes place, while the commencement of an anti-lock control operation is signalled to the wheel pressure-pattern stage 6 by way of line e2. The foregoing are only examples for data which are exchanged to meet a given application and which contribute to improving the formation of the pattern and the control.

What is claimed is:

1. A method for controlling the brake system of a two-channel anti-lock system comprising the steps of: measuring and analyzing the wheel rotational behavior for generating a vehicle reference speed signal related thereto as well as braking-pressure control signals, measuring quantities determining the braking pressure in the wheel brakes from which measured quantities a wheel pressure pattern is derived that is by approximation representative of the pressure variation in the wheel brakes and, in conjunction with the wheel rotational behavior, is utilized for the purpose of wheel slip control and for determining the braking-pressure control signals, and ascertaining the vehicle reference speed ($v_{REF}$) from the rotational behavior of the front wheels (VL, VR) and the wheel pressure pattern (RDM).

2. A circuit configuration for controlling the brake system of a two-channel anti-lock system, comprising in combination: sensors for determining the wheel rotational behavior, circuits for generating a vehicle reference speed and braking pressure control signals and for forming a wheel pressure pattern and electric signals which, by approximation, represent the pressure variation in the wheel brakes and which are included in the signal processing for generating the braking-pressure control signals, and wherein the front wheel (VR, VL) are each equipped with one rotational speed sensor (1, 2) whose output signals are logically combined with the wheel-pressure-pattern signals for forming the vehicle reference speed ($v_{REF}$).

* * * * *